(12) United States Patent
Ohshima et al.

(10) Patent No.: US 6,951,515 B2
(45) Date of Patent: Oct. 4, 2005

(54) GAME APPARATUS FOR MIXED REALITY SPACE, IMAGE PROCESSING METHOD THEREOF, AND PROGRAM STORAGE MEDIUM

(75) Inventors: Toshikazu Ohshima, Kawasaki (JP); Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,084

(22) Filed: Feb. 17, 2000

(65) Prior Publication Data

US 2003/0032484 A1 Feb. 13, 2003

(30) Foreign Application Priority Data

Jun. 11, 1999 (JP) .......................................... 11-165710

(51) Int. Cl.[7] .............................................. A63F 13/00
(52) U.S. Cl. ........................................ 463/31; 463/33
(58) Field of Search ................................ 463/1, 30–34

(56) References Cited

U.S. PATENT DOCUMENTS

| | | | | |
|---|---|---|---|---|
| 5,423,554 A | * | 6/1995 | Davis | .......................... 463/30 |
| 5,577,981 A | * | 11/1996 | Jarvik | ............................ 482/4 |
| 5,815,411 A | | 9/1998 | Ellenby et al. | |
| 5,850,352 A | * | 12/1998 | Moezzi et al. | ................ 348/13 |
| 5,900,849 A | * | 5/1999 | Gallery | ........................... 345/8 |
| 6,064,749 A | * | 5/2000 | Hirota et al. | ............... 382/103 |
| 6,066,075 A | * | 5/2000 | Poulton | ......................... 482/8 |
| 6,522,312 B2 | * | 2/2003 | Ohshima et al. | ............... 345/8 |
| 2002/0084974 A1 | * | 7/2002 | Oshima et al. | ............. 245/156 |

FOREIGN PATENT DOCUMENTS

| | | | | |
|---|---|---|---|---|
| EP | 000899690 A2 | * | 3/1999 | .......... G06T/15/00 |
| JP | 11-003437 | | 1/1999 | |
| JP | 11-88913 | | 3/1999 | |

* cited by examiner

*Primary Examiner*—Jessica J. Harrison
(74) *Attorney, Agent, or Firm*—Fitzpatrick, Cella, Harper & Scinto

(57) ABSTRACT

A game apparatus allows a virtual object to act in a mixed reality space as if it had its own will. A player can play a game with the virtual object. Rules for controlling the action patterns of the virtual object on the basis of the objective of the game, and the relative positional relationship between the virtual object and the real object is pre-stored. The next action pattern of the virtual object is determined based on an operator command, the stored rule(s), a simulation progress status, and geometric information of a real object(s).

19 Claims, 21 Drawing Sheets

GAME APPARATUS FOR MIXED REALITY SPACE, IMAGE PROCESSING METHOD THEREOF, AND PROGRAM STORAGE MEDIUM

FIELD OF THE INVENTION

The present invention relates to a game apparatus which allows a player to play a game in a mixed reality space which includes both real and virtual objects and, more particularly, to an apparatus which can present a game environment in which a virtual object that moves/acts in response to movements/actions of a real object.

BACKGROUND OF THE INVENTION

The present applicant disclosed a game apparatus that allows a player to play a game in a mixed reality environment in Japanese Patent Laid-Open No. 11-088913. In this game apparatus, two opponent players hit and return a virtual puck toward each other.

The virtual puck is presented in a mixed reality space as a virtual image while being given location and velocity vectors. When the player manipulates a mallet as a real object, the apparatus computes the moving path of the puck after collision on the basis of the location and velocity vectors of the mallet and virtual puck in accordance with the law of collision in physics, renders a CG image of the virtual puck in the mixed reality space, and presents it to the player.

However, in Japanese Patent Laid-Open No. 11-088913, the puck movement is determined by player's actions. More specifically, if the player does not hit the puck, the puck does not move, and the moving velocity and direction of the puck are merely determined by the manipulation velocity and direction of the mallet of the player. That is, in the conventional mixed reality environment, the virtual object makes only passive motions.

On the other hand, a real object (especially, an living creature) acts according to its own will, and determines its own action in accordance with its relationship with another real object(s), e.g., the presence or behavior and layout position of that object.

For this reason, especially the conventional game apparatus suffers monotony since only passive virtual objects are rendered.

It is an object of the present invention to provide a game apparatus which determines movements/actions of a virtual object in a mixed reality space in consideration of its relationship with a real object.

SUMMARY OF THE INVENTION

In order to achieve the above object, a game apparatus with which a player plays a game with virtual object(s) in a mixed reality space comprising:

viewpoint detection means for detecting the location/posture of a viewpoint of the player; geometric information acquisition means for acquiring geometric information of real object(s);

recognition means for recognizing a current, relative relationship between the virtual object(s) and real object(s);

a rule memory for storing rules for controlling the action of the virtual object(s);

computation means for determining the next action of the virtual object(s) in accordance with the rules stored in said rule memory and in correspondence with the location/posture of the real object(s), and computing thee location/posture of the virtual object(s) after the determined action; and presentation means for generating at least one of image of the virtual object on the basis of the location/posture of the virtual object(s) after the action and the location/posture of the viewpoint position of the player, and for representing the mixed reality space to the player by superimposing the virtual object image(s) on the player's view of the real space.

According to a preferred aspect of the present invention, the presentation means further comprising, image-capturing means for capturing real space images of said player's view of the real space;

image generation means for generating mixed reality images representing of the mixed reality space by superimposing or overlaying said virtual object image(s) on said real space images; and a video see-through type display means that the player wares wherein said mixed reality images are displayed.

According to a preferred aspect of the present invention, the presentation means further comprising, An optical see-through type display means that the player wares wherein said virtual object image(s) are displayed.

According to a preferred aspect of the present invention, the game apparatus further comprising, status detecting means for detecting status of the player;

wherein said computation means determines a next action of the virtual object in accordance with the rule stored in said rule memory and in correspondence with the location/posture of the real object and/or the status, and computing a location/posture of the virtual object after the determined action.

The movement of the virtual object is controlled by a rule which adapts itself on the basis of an objective of the game, and the relative relationship between the virtual object and real object. Hence, the player experiences an illusion as if the virtual object had its own will, thus making the game more fun to play.

It is interesting if the movement of the virtual object changes in correspondence with the positional relationship with the real object. Hence, according to a preferred aspect of the present invention, the current, relative relationship includes a layout relationship between the virtual object and real object at that time in the mixed reality space.

It is interesting if the movement of the virtual object changes in correspondence with the behavior of the real object. Hence, according to a preferred aspect of the present invention, the current, relative relationship includes a behavior of the real object with respect to the virtual object at that time in the mixed reality space.

According to a preferred aspect of the present invention, the real object includes the player himself or herself.

According to a preferred aspect of the present invention, the real object includes a plurality of players who operate the game apparatus, and the plurality of players share a single mixed reality space.

If the real object is an object which is fixed in position, according to a preferred aspect of the present invention, the geometric information acquisition means comprises:

a predetermined memory for pre-storing location information and shape information of the real object; and means for reading out the location information and shape information of the real object from the memory as needed.

If the real object is an object which is movable but does not deform, according to a preferred aspect of the present invention, the geometric information acquisition means comprises:

a predetermined memory for pre-storing shape information of the real object;

a location/posture sensor for detecting a location/posture of the real object; and means for setting a region the real object is expected to occupy in the mixed real space in accordance with the detected location/posture of the real object. In this case, the precision of the shape information can be improved.

If the real object is a player, the geometric information acquisition means comprises:

a sensor for detecting a location/posture of a head of the player; and means for setting a region having a fixed, known shape that approximates the player in the mixed reality space in accordance with the detected location/posture of the head.

Since the player is a person, his or her shape changes complicatedly. By setting a fixed known shape as the player shape, real-time processing is possible.

According to a preferred aspect of the present invention, when the game is a battle game with the virtual object, an objective is to decrease an expected score of the player.

According to a preferred aspect of the present invention, when the game is a cooperative game with the virtual object, an objective is to increase an expected score of the player.

According to a preferred aspect of the present invention, the rule controls the action of the virtual object on the basis of an objective of the game and a relative relationship between the virtual object and real object.

According to a preferred aspect of the present invention, the rule stored in the rule memory expresses the action of the virtual object as an action pattern with a predetermined aim for achieving the objective.

According to a preferred aspect of the present invention, the pattern has a path disadvantageous to the player in consideration of a layout relationship between the virtual object and real object.

In a mixed reality environment, it is indispensable to detect the three-dimensional location/posture, and when the player is one of real objects, an output from the viewpoint detection means for detecting the location/posture of the viewpoint of the player is also used as information which is to be acquired by the geometric information acquisition means and pertains to a location and shape of the player, thus minimizing an increase in cost.

In a mixed reality environment, it is indispensable to detect the three-dimensional location/posture, and the viewpoint detection means detects a location/posture of a head of the player, and the apparatus further comprises detection means for detecting a location/posture of a hand of the player; and means for recognizing a relative location of the hand of the player with respect to the head as a command on the basis of an output from the detection means, thus implementing an intuitive user interface by means of actions.

According to a preferred aspect of the present invention, the presentation means comprises:

means for aligning the location/posture of the real object to the location/posture of the virtual object after movement;

means for generating an image of the virtual object after alignment in correspondence with an occlusion relationship; and a head-mounted display device.

Note that the above object can also be achieved by an image processing method for a game apparatus with which a player plays a game with virtual object(s) in a mixed reality space comprising:

viewpoint detection step for detecting the location/posture of a viewpoint of the player;

geometric information acquisition step for acquiring geometric information of real object(s);

recognition step for recognizing a current, relative relationship between the virtual object(s) and real object(s);

a rule memory for storing rules for controlling the action of the virtual object(s);

computation step for determining the next action of the virtual object(s) in accordance with the rules stored in said rule memory and in correspondence with the location/posture of the real object(s), and computing thee location/posture of the virtual object(s) after the determined action; and presentation step for generating at least one of image of the virtual object on the basis of the location/posture of the virtual object(s) after the action and the location/posture of the viewpoint position of the player, and for representing the mixed reality space to the player by superimposing the virtual object image(s) on the player's view of the real space.

Furthermore, the above object can be achieved by a storage medium which stores a program of an image processing method for a game apparatus with which a player plays a game with virtual object(s) in a mixed reality space comprising:

viewpoint detection program step for detecting the location/posture of a viewpoint of the player;

geometric information acquisition program step for acquiring geometric information of real object(s);

recognition program step for recognizing a current, relative relationship between the virtual object(s) and real object(s);

a rule memory for storing rules for controlling the action of the virtual object(s);

computation program step for determining the next action of the virtual object(s) in accordance with the rules stored in said rule memory and in correspondence with the location/posture of the real object(s), and computing thee location/posture of the virtual object(s) after the determined action; and presentation program step for generating at least one of image of the virtual object on the basis of the location/posture of the virtual object(s) after the action and the location/posture of the viewpoint position of the player, and for representing the mixed reality space to the player by superimposing the virtual object image(s) on the player's view of the real space.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A game apparatus according to the present invention will be described in detail hereinafter with reference to the accompanying drawings.

<Behavior of Virtual Object>

Figure 1:
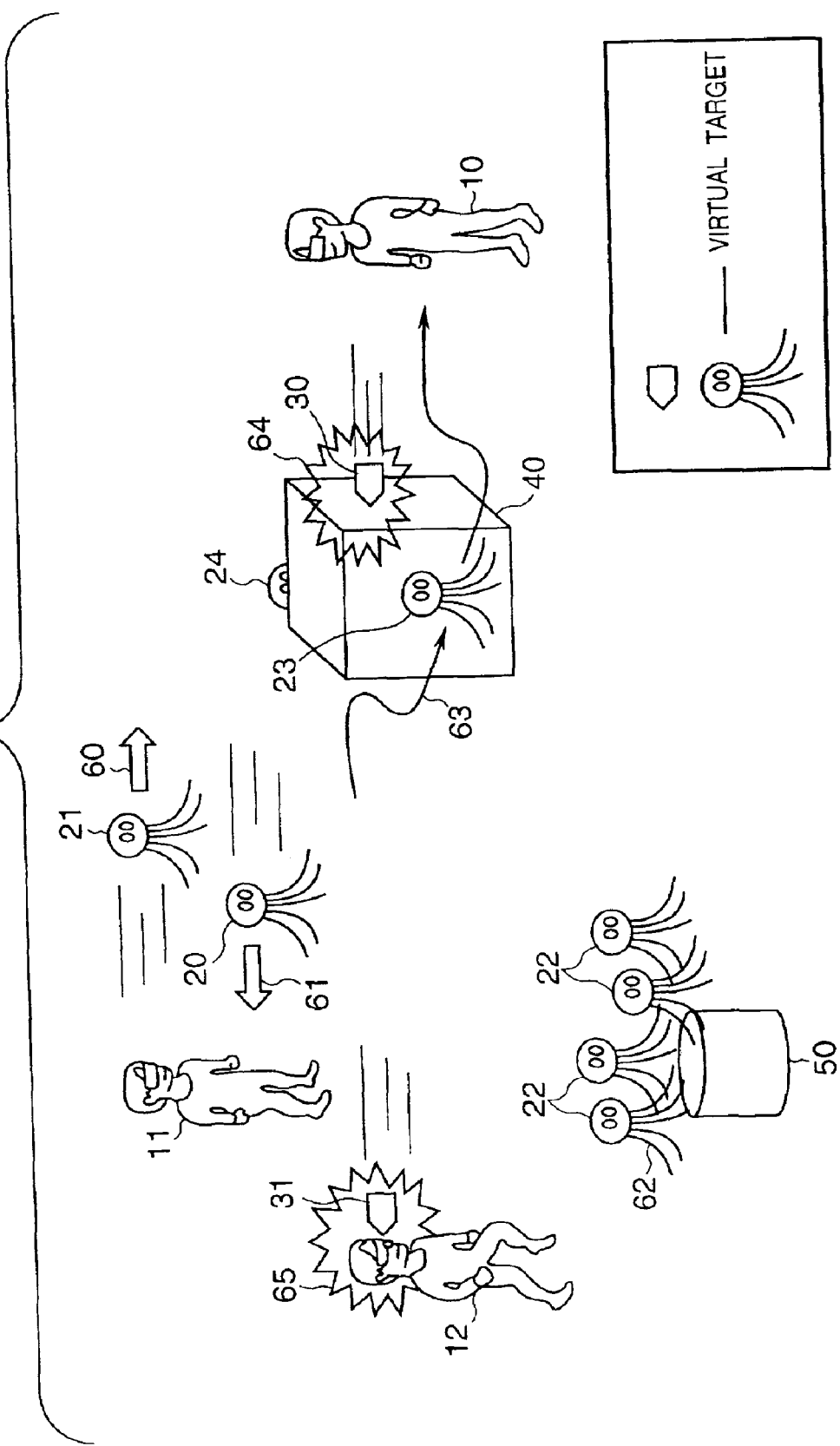
FIG. 1 is a view for explaining the action pattern of a virtual object (target or the like) in a game according to an embodiment of the present invention.

FIG. 1 depicts the relationship between actions of the user (player) and a virtual object in a game apparatus of this embodiment. As can be seen from FIG. 1, a virtual object of this game associates itself with the user (player) as if it had its own will and objective.

That is, referring to FIG. 1, three players 10, 11, and 12 join the game. In this game, a cubic real object 40 and columnar real object 50 are provided. In this game, virtual "spacemen" (to be referred to as targets hereinafter) 20 to 24 as opponents are displayed. Assume that a virtual object 30 as a "bullet" fired by the player 10 hits the real object 40. On the other hand, assume that a virtual object 31 as a bullet fired by the target 20 hits the player 12.

In this case, each virtual object makes unique movements or actions. That is, the target 21 as a spaceman runs away (60) by sensing the presence of the player 11. Or the target 21 comes on or chases the player 11 (61). The target 23 dodges not to collide against the real object 40 (63). The plurality of targets 22 gather around the real object 50 (62). The target 24 hides behind the real object 40 by sensing the presence of the player 10. The virtual bullet 30 fired by the player 10 explodes (64) upon colliding against the real object 40. Likewise, the bullet 31 explodes (65) upon hitting the player 12.

In this manner, the virtual objects that appear in the game system of this embodiment make actions such as collision, explosion, movement, dodge, and the like in consideration of the presence, location, layout, and behavior of the real objects or the location, behavior, and line of sight of the player.

<Arrangement of Game Environment>

Figure 2:
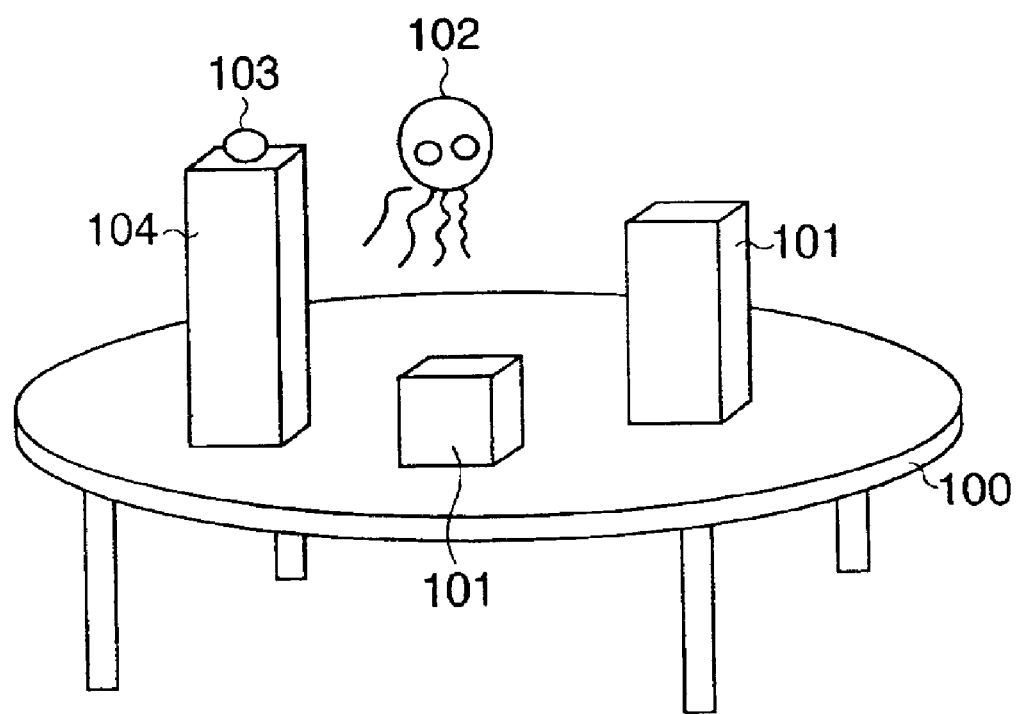
FIG. 2 is a perspective view showing a game environment of a game apparatus according to the embodiment of the present invention.
Figure 3:
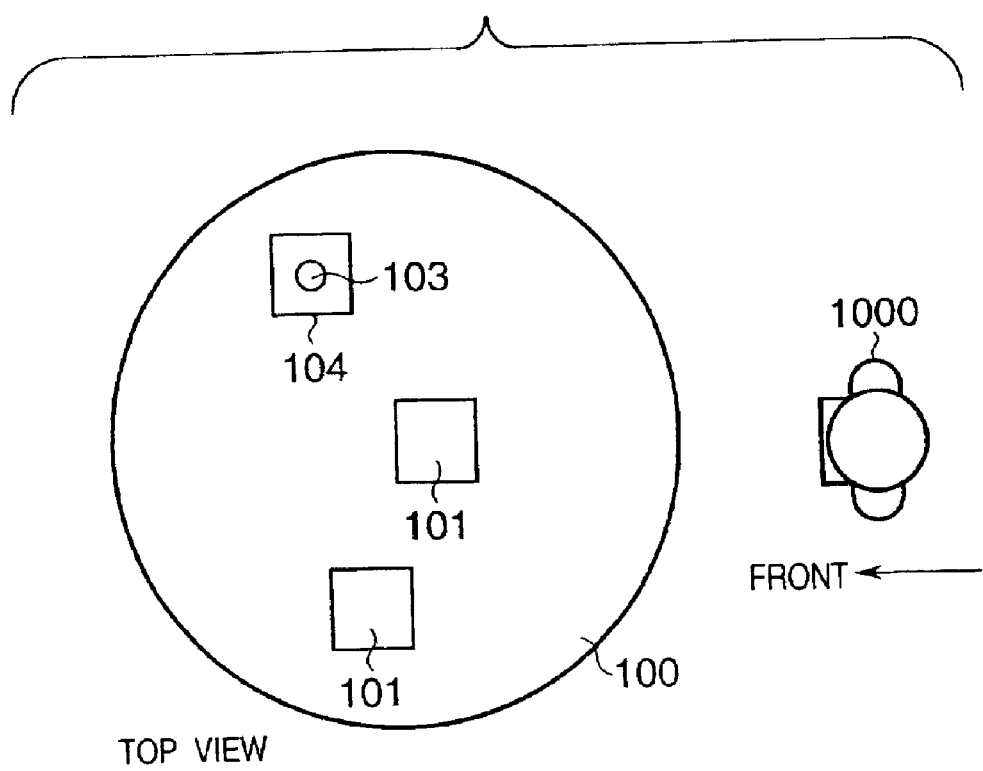
FIG. 3 is a top view showing the game environment of the game apparatus according to the embodiment of the present invention.

FIGS. 2 and 3 show the outer appearance of a game environment in which the game apparatus according to the embodiment of the present invention is used.

Referring to FIGS. 2 and 3, reference numeral 100 is a table on which real objects that appear in the game are placed. The table 100 restricts real objects for which matching with the virtual objects must be considered. In other words, objects placed on the table 100 require an alignment process with the virtual objects, an occlusion process as a result of the alignment process, and the like.

Two still real objects 101 and a movable real object 104 are placed on the table 100. Since the real objects 101 are still, their locations and shapes can be input in advance. Since the real object 104 changes its location although its shape remains the same, it has a location sensor 103.

As will be described later, the player joins the game wearing a head-mounted display device (to be abbreviated as an HMD hereinafter). FIG. 2 also depicts a virtual object 102 displayed on the display screen of the HMD when a certain player sees objects on the table via the HMD. Since this virtual object is displayed in the HMD, it is not seen by a third party at an objective viewpoint position who does not join the game.

Figure 4:
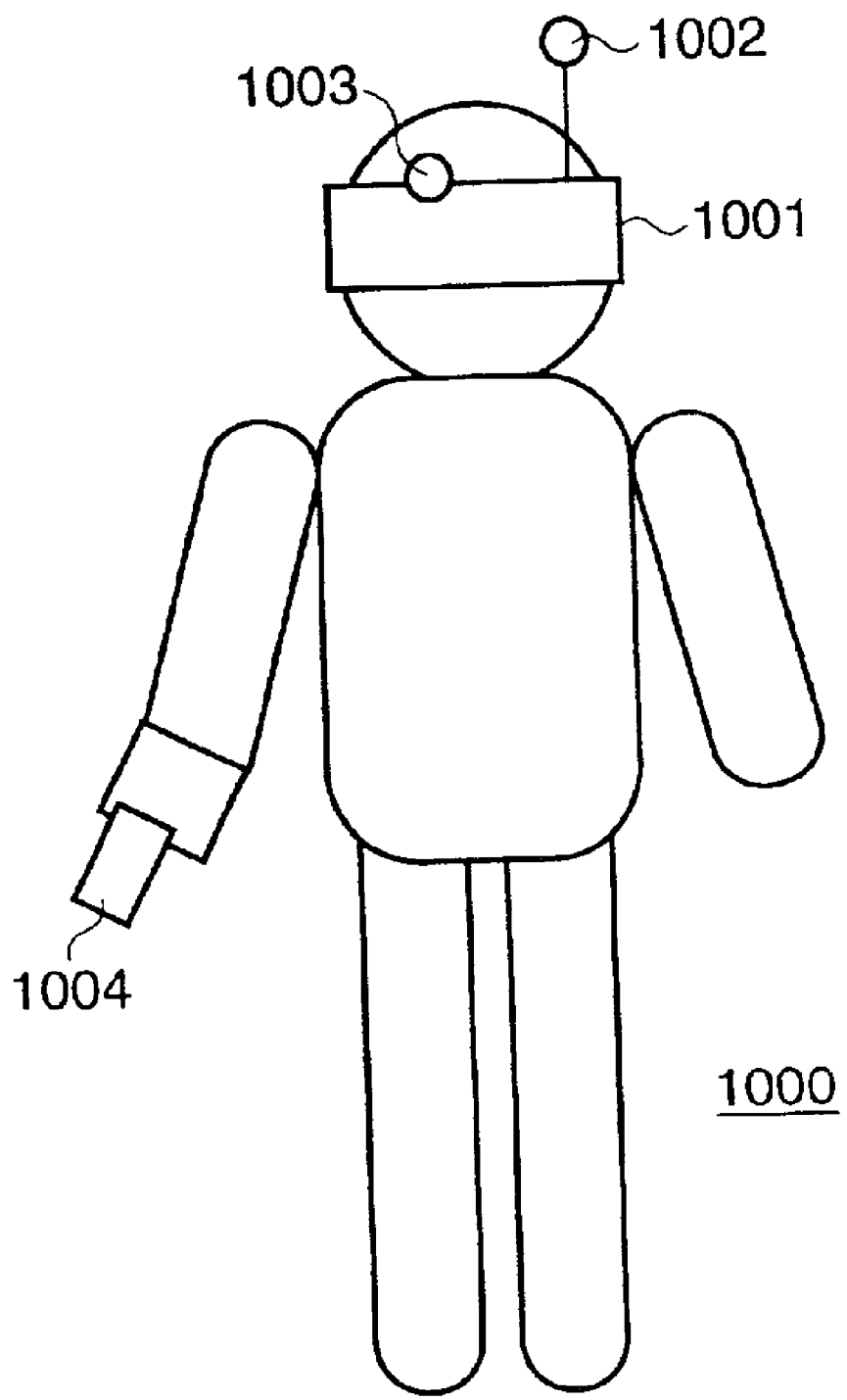
FIG. 4 is a view illustrating a state in which a player who joins the game wears an equipment.

FIG. 3 is a top view of the table 100. In this case, no virtual object 102 is illustrated, and a player 1000 who joins the game is illustrated instead. FIG. 4 shows the player 1000.

Referring to FIG. 4, the player 1000 wears an HMD 1001 on his or her head, and a controller 1004 having a gun shape on his or her hand. A location/posture sensor 1002 and a video camera 1003 which captures an image in front of the player are fixed to the HMD 1001. When the HMD 1001 is attached to the head of the player, the head location/posture sensor 1002 outputs a signal representing the head location/posture of the player 1000. Since the video camera 1003 uses, e.g., a video see-through HMD in this game, it can sense a real landscape in real time. Hence, when an optical see-through HMD is used, the video camera 1003 is not required.

The controller 1004 has a gun shape to make the game more fun to play for the player, but is an input device serving as a user interface in practice. That is, the controller 1004 comprises a location/posture sensor (1005 in FIG. 5) for detecting the location/posture of a hand of the player, and a switch 1006 for detecting an action of a trigger (not shown) as a shooting action of the player.

<Arrangement of Game Management Apparatus>

Figure 5:
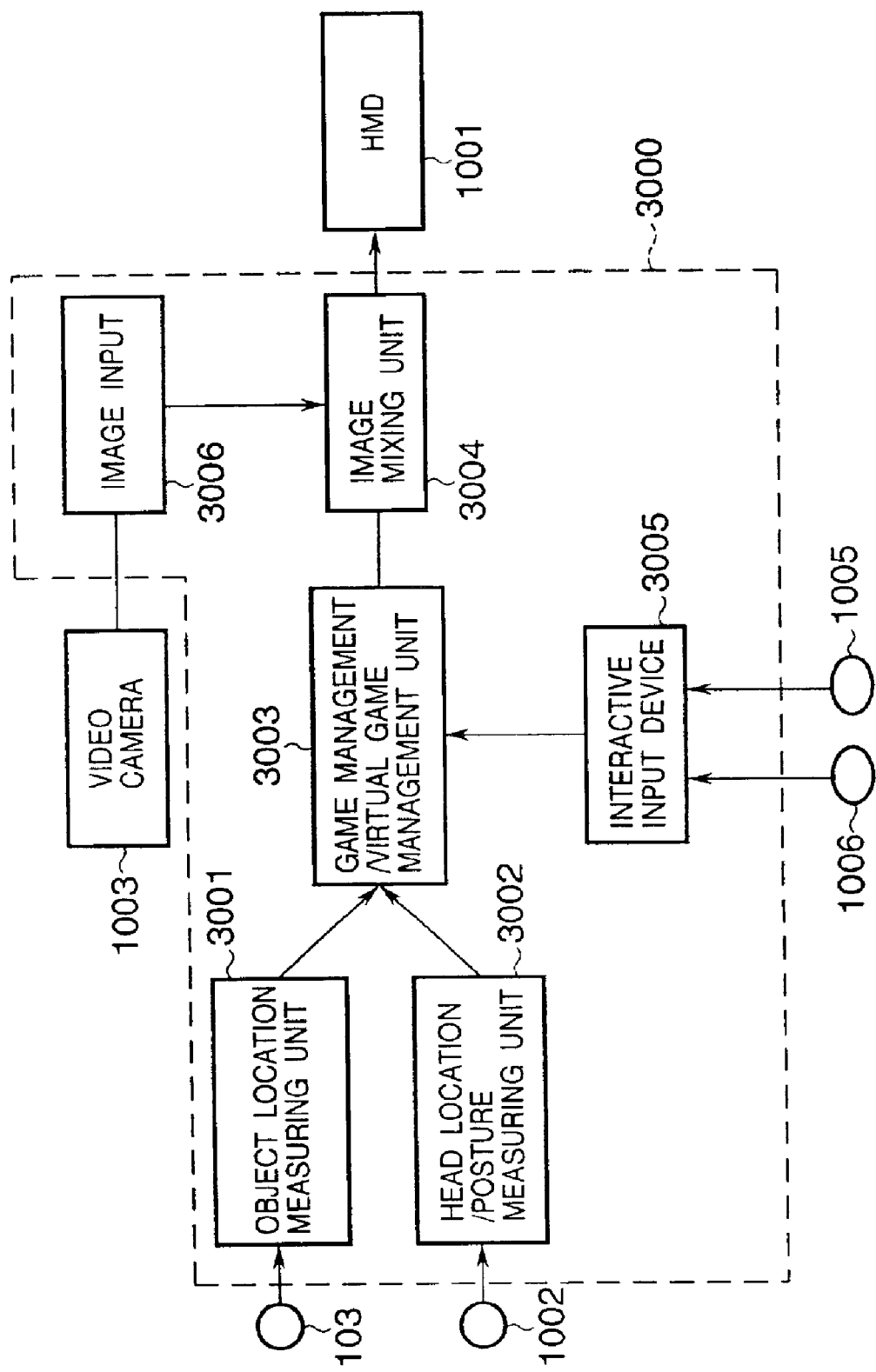
FIG. 5 is a block diagram showing the arrangement of a controller of the game apparatus in case of a single player.
Figure 6:
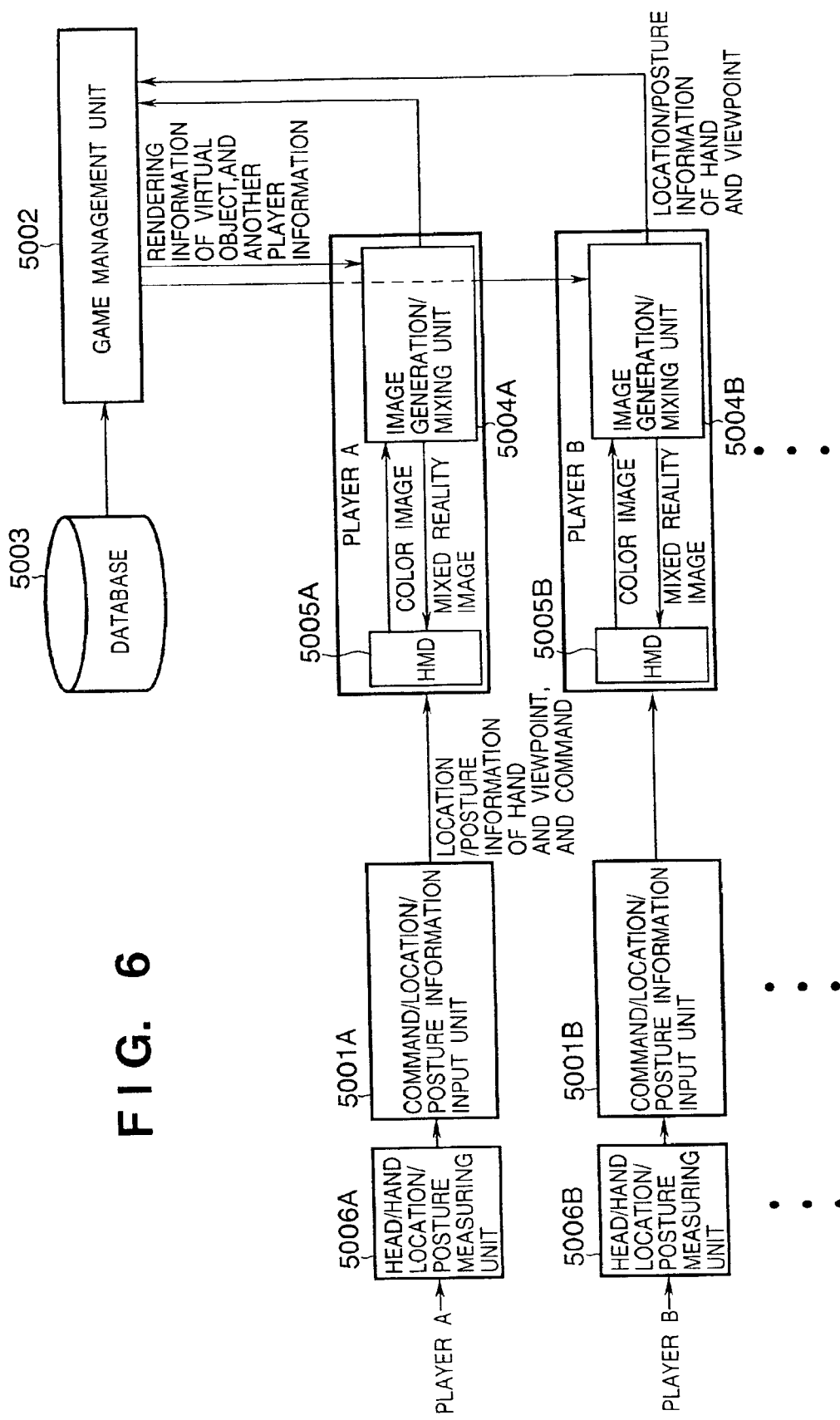
FIG. 6 is a block diagram showing the arrangement of a controller of the game apparatus in case of two players.

FIG. 5 shows the arrangement of a game management apparatus 3000 used in the game system shown in FIGS. 2 to 4. FIG. 5 shows the arrangement of the game management apparatus 3000 in case of a single player. If there are a plurality of players, the system arrangement shown in, e.g., FIG. 6, is used.

Referring to FIG. 5 that shows a single-player game system, a measuring unit 3001 receives the output signal from the location sensor 103 provided to the real object 104 to measure the location of the object 104. A location/posture measuring unit 3002 measures the location/posture of the head of the player (in other words, the location/posture of the viewpoint of the player) from the output signal of the location/posture sensor 1002 provided to the head of the player in accordance with a known scheme (e.g., Japanese Patent Laid-Open No. 11-088913 mentioned above). An interactive input device 3005 receives the signal from the sensor 1005 attached to user's hand to measure the location/posture of the hand, and also detects that the player has operated the trigger switch 1006.

The location signal of the real object 104, the location/posture signal of the viewpoint of the player, the location/posture signal of the hand of the player, and a trigger signal indicating whether or not the trigger has been operated are input to a game management/virtual image generation unit 3003. This unit generates virtual images such as targets, bullets, and the like in accordance with rules to be described later, and sends them to an image mixing unit 3004. Since the image mixing unit 3004 receives a real image sensed by the video camera 1003 of the player from an input unit 1006, it mixes the generated virtual images with the real image (video image). Since the image mixing unit 3004 receives dynamic location information of the real object 104 measured by the location measuring unit 3001 and still location information of each of the two still real objects 101 in the example shown in FIG. 2, it aligns the real and virtual objects on the basis of such location information and that (and shape information) of each generated virtual image, and also executes an occlusion and mask processes as needed, thus assuring matching between these objects.

The mixed image whose matching is adjusted is output to the HMD 101 and is presented to the player.

Figure 7:
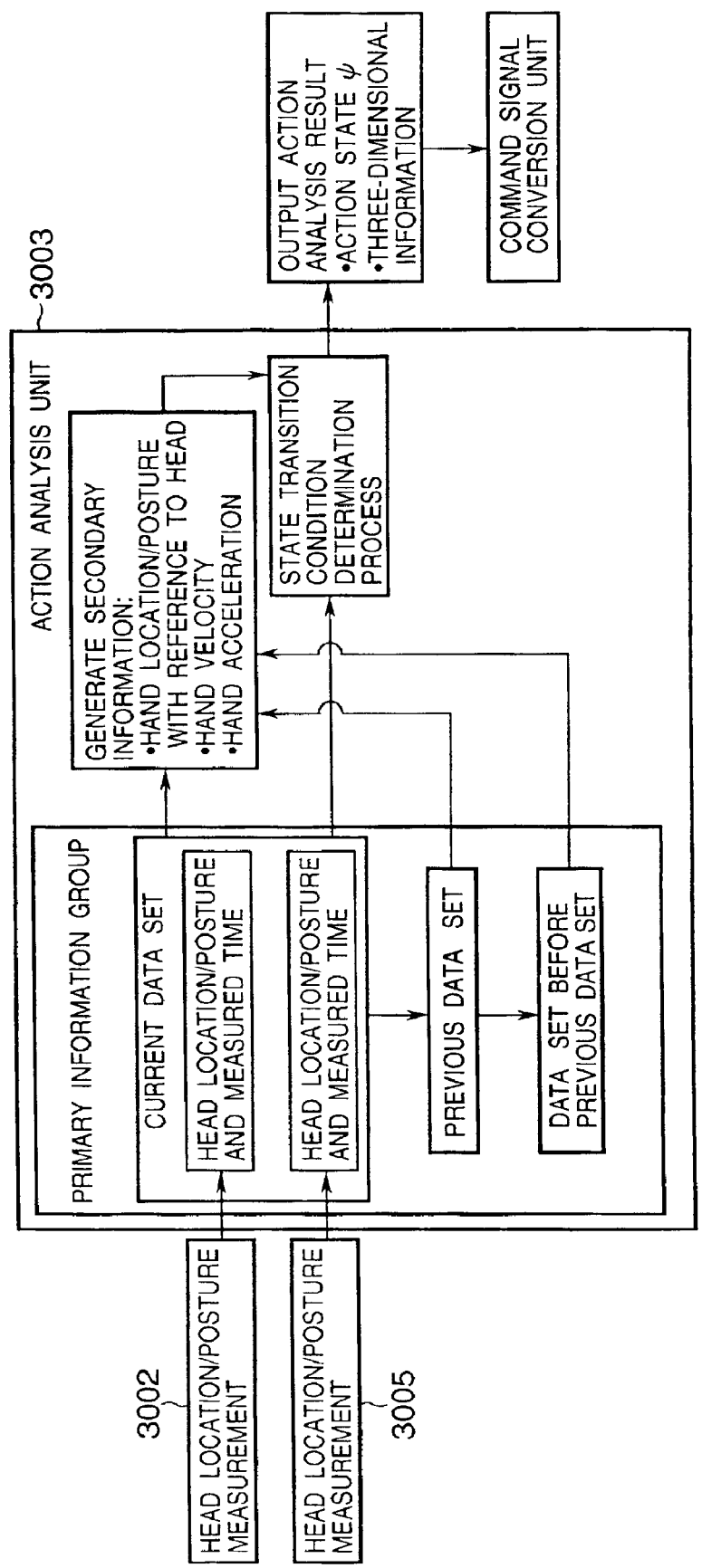
FIG. 7 is a block diagram for explaining an action→command conversion function in a game management/virtual image generation unit 3003.

This game adopts a scheme that recognizes player's actions as game commands for the purpose of improving operability. FIG. 7 is a block diagram showing functions which are used in the game management/virtual image generation unit 3003 to interpret player's actions so as to recognize commands. The feature of this scheme lies in that the location/posture of the head is measured by the measuring unit 3002, the location/posture of the hand is measured by the measuring unit 3005, and player's actions are recognized on the basis of the hand location/posture relative to the head location/posture.

FIG. 6 shows the system used when a plurality of players join the game. Players A and B who represent a plurality of players A, B, C, D, . . . will be explained below, but circuits corresponding to the number of players are provided in practice to execute processes. Referring to FIG. 6, the core of this game system comprises measuring units 5006A and 5006B for measuring the locations/postures of the heads and hands of players A and B, input units 5001A and 5001B for receiving the location/posture information (three-dimensional location/posture information) from the respective players, a game management unit 5002, image generation/mixing units 5004A and 5004B respectively for players A and B, and a database 5003 for storing three-dimensional information of each still object. Players A and B respectively wear HMDs 5005A and 5005B. Cameras (not shown in FIG. 6) are attached to the HMDs as in FIG. 5, and color images from the cameras of the individual players are sent to the image generation/mixing units 5004A and 5004B.

The three-dimensional location/posture information input units 5001A and 5001B send the location/posture information of the hands and viewpoints of players A and B to the image generation/mixing units 5004A and 5004B.

The image generation/mixing units 5004A and 5004B correspond to the image mixing unit 3004 in FIG. 5, mix color images from the video cameras corresponding to the camera 1003 in FIG. 5 and virtual images generated based on rendering information of virtual objects sent from the game management unit 5002 to produce mixed reality images, and send them to the HMDs 5005A and 5005B respectively.

Figure 8:
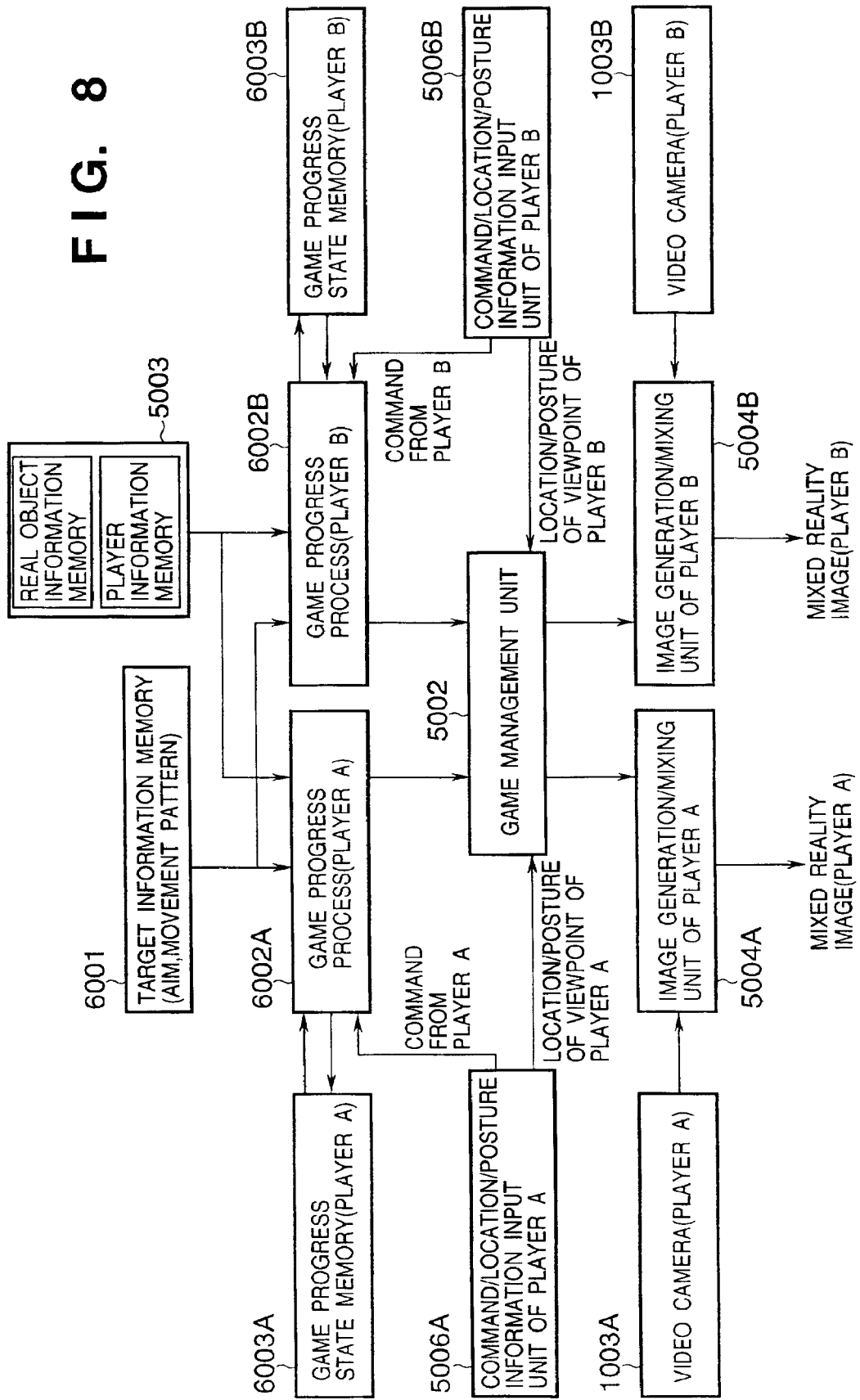
FIG. 8 is a block diagram showing the detailed arrangement of a game management unit 5002 shown in FIG. 6.

FIG. 8 explains the arrangement of the game management unit 5002 and shows the I/O relationship of information among its generation unit, the command/location/posture information input units 5006A and 5006B, and the image generation/mixing unit 5004A and 5004B.

Game progress states of players A and B are respectively stored in game state memories 6003A and 6003B. Various kinds of information (objectives, aims, and movement patterns) of individual targets are pre-stored in a memory 6001. The objective of each target is to attack a player and to decrease his or her expected value. The aim of each target is to shoot a player, and to dodge an attack from the player. The movement pattern controls the target to:

hide behind a still object;
assemble with other targets;
escape from a player who is closing in;
chase a player running away from the target; and
move while dodging a real object.

Note that the objective and aim may be set to be the same.

The database 5003 stores three-dimensional image information such as shape information, color, and the like of each real object. Furthermore, the database 5003 includes information that pertains to each player, for example, information that represents the player size (normally approximated by a rectangular parallelopiped), and the like. Approximation by a rectangular parallelopiped is made since the three-dimensional shape of the player need not be tracked accurately in real time. That is, if a bullet arrives within the range of this size, it is determined that the bullet hit the player.

The current game progress states of the individual players are stored in the memories 6003A and 6003B. In this game, a command input by a player is determined by each command/location/posture information input unit 5006A (5006B) on the basis of the hand location/posture with respect to the head. The command input by the player is input to a game progress processor 6002A (6002B) of each player via the command/location/posture information input unit 5006A (5006B). The game progress processor 6002A (6002B) manages progress of the game in accordance with the game progress state stored in the memory 6003A (6003B), target information stored in the memory 6001, and information which is stored in the database 5003 and pertains to the players and real objects. A change in game along with the progress of the game is stored in the memory 6003A (6003B) to update its contents. The progress result of each player, i.e., information that pertains to the location/posture of a target, the location/posture of a bullet, and the like in relation to that player is input from the processor 6002A (6002B) to the game management unit 5002. The game management unit 5002 systematically manages a virtual space for each player. With this systematic management, virtual objects such as a target, bullet, and the like, which have changed in relation to player A, and those which have changed in relation to player B are spatially merged. With this merging, a plurality of players can share a single mixed reality space.

<Control of Movement of Virtual Object>

Figure 9:
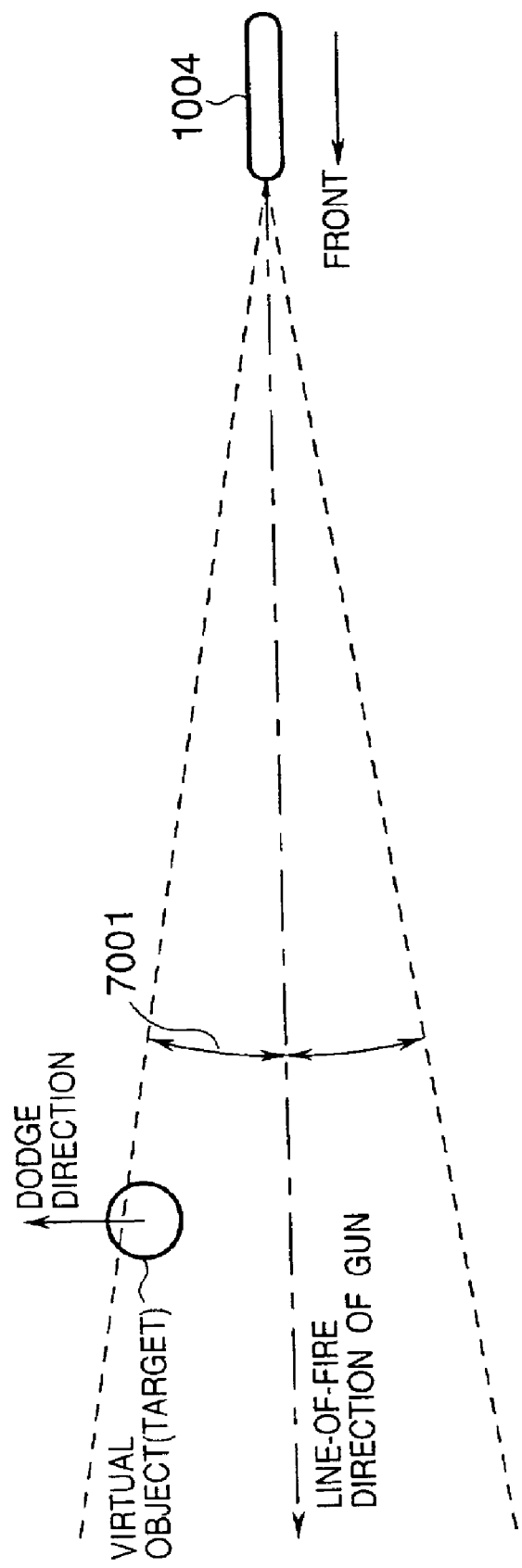
FIG. 9 is a view for explaining the pattern of a dodge action of a virtual object.

FIG. 9 explains an example of a dodge action of a virtual object. More specifically, when the player points the gun-shaped controller 1004 forward, the game progress processor 6002 determines the moving direction and distance of a target falling within a conical range 7001 in a line-of-fire direction of the gun so that the target moves outside the range 7001.

Figure 10:
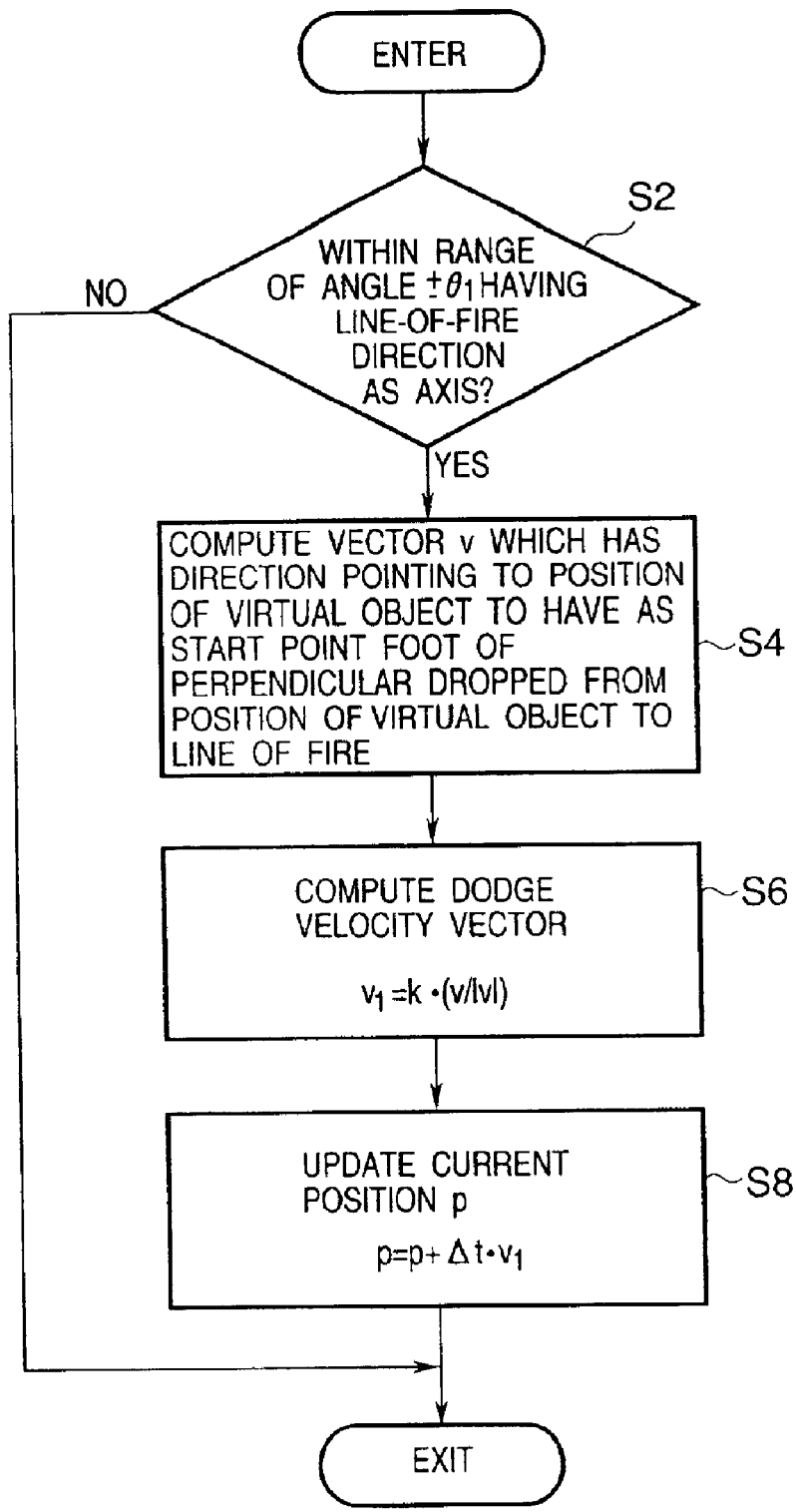
FIG. 10 is a flow chart showing the control sequence of the dodge action of the virtual object.

FIG. 10 is a flow chart showing the control sequence for implementing the action of the virtual object shown in FIG. 9. It is checked in step S2 if a virtual object falls with the range of an angle $\pm\theta_1$ to have the line-of-fire direction as an axis. The angle $\theta_1$ matches the range 7001 shown in FIG. 9. As the angle $\theta_1$ is larger, the target can escape more easily. In step S4, a vector v which has as a start point the foot of a perpendicular dropped from the position of the virtual object to the line of fire and has a direction pointing to the position of the virtual object is computed. In step S6, a dodge velocity vector $v_1$ is computed based on this vector v:

$$v_1 = k \cdot (v/|v|)$$

where k is a coefficient for adjusting the magnitude of the velocity. In step S8, the current position p of the virtual object is updated:

$$p = p + \Delta t \cdot v_1$$

Figure 11:
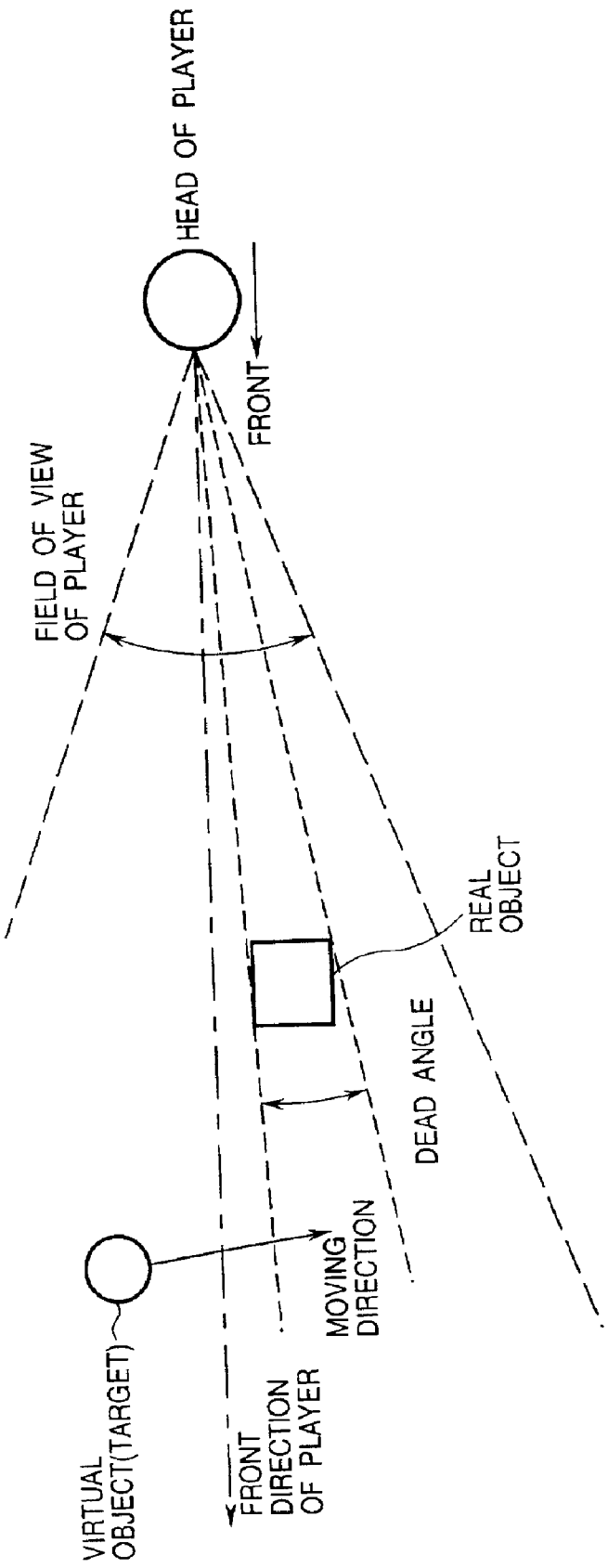
FIG. 11 is a view for explaining the pattern of a dodge action of the virtual object to hide behind a real object.

FIG. 11 explains an example of a hide action of a virtual object. More specifically, when a target falls within the field of view of a player, which has the front direction of his or her head as an axis, the game progress processor 6002 determines the moving direction and distance of that target, so that the target moves to fall within a dead angle range which is formed by a real object present within the field of view of the player when viewed from the player.

Figure 12:
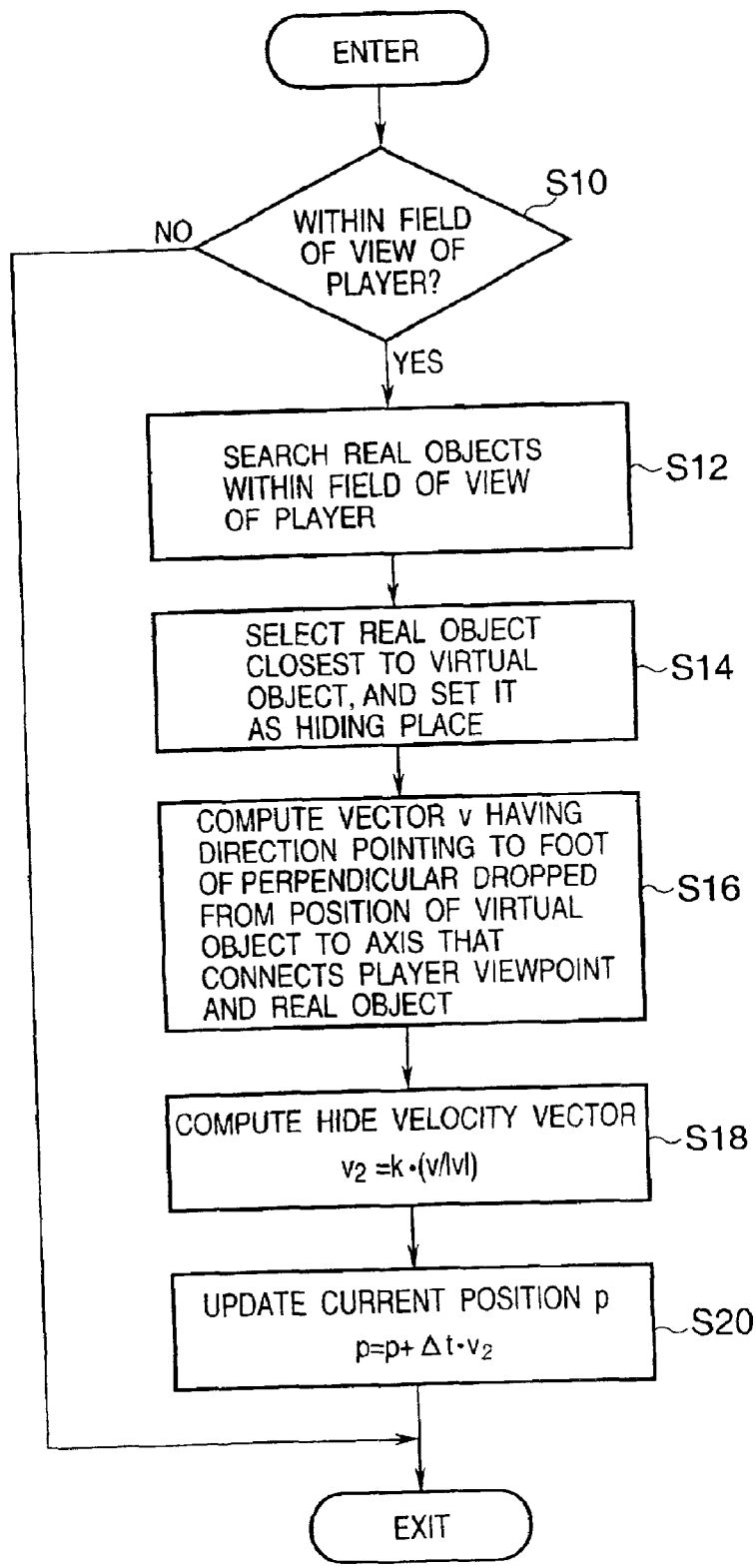
FIG. 12 is a flow chart showing the control sequence of the hide action of the virtual object.

FIG. 12 is a flow chart showing the control sequence for implementing the action of the virtual object shown in FIG. 11.

It is checked in step S10 if a virtual object falls within the field of view of the player. In step S12, real objects falling within the field of view of the player are searched. In step S14, a real object closest to the virtual object is selected from those found in step S12, and is set as a hiding place. In step S16, the movement of the virtual object is defined. That is, a vector v pointing to the foot of a perpendicular that was dropped from the position of the virtual object to an axis that connects the player's viewpoint and real object is computed. In step S18, a hide velocity vector is computed by:

$$v_2 = k \cdot (v/|v|)$$

In step S20, the current position (position after the hide action) of the virtual object is updated.

Figure 13:
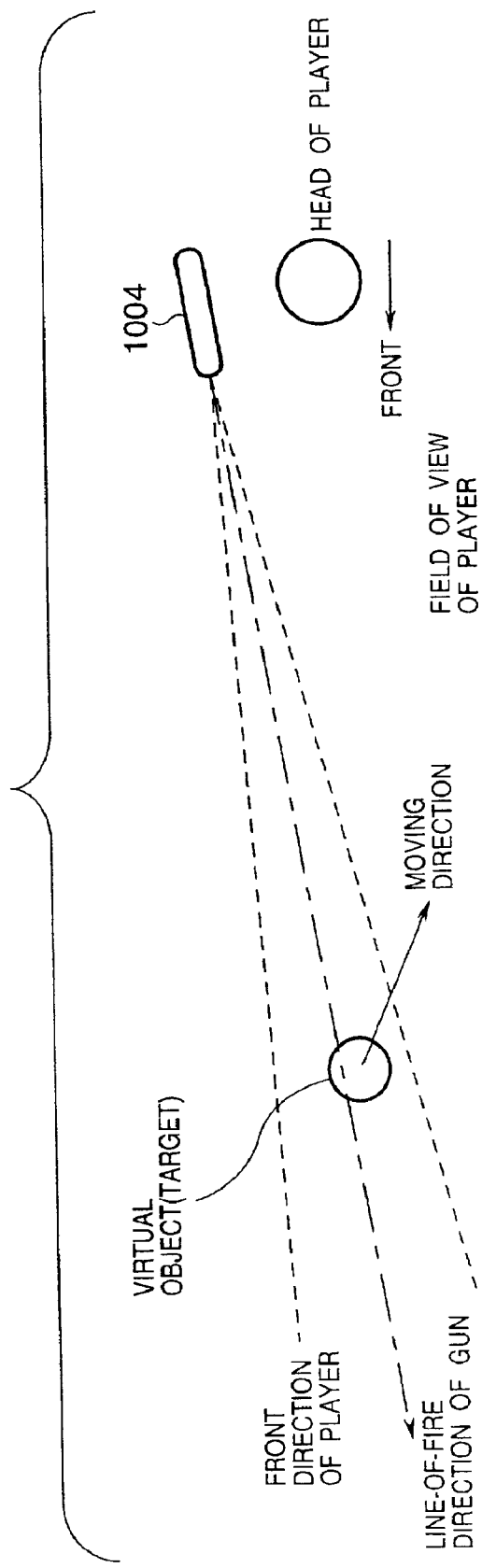
FIG. 13 is a view for explaining the pattern of an attack action of the virtual object with respect to the player.
Figure 14:
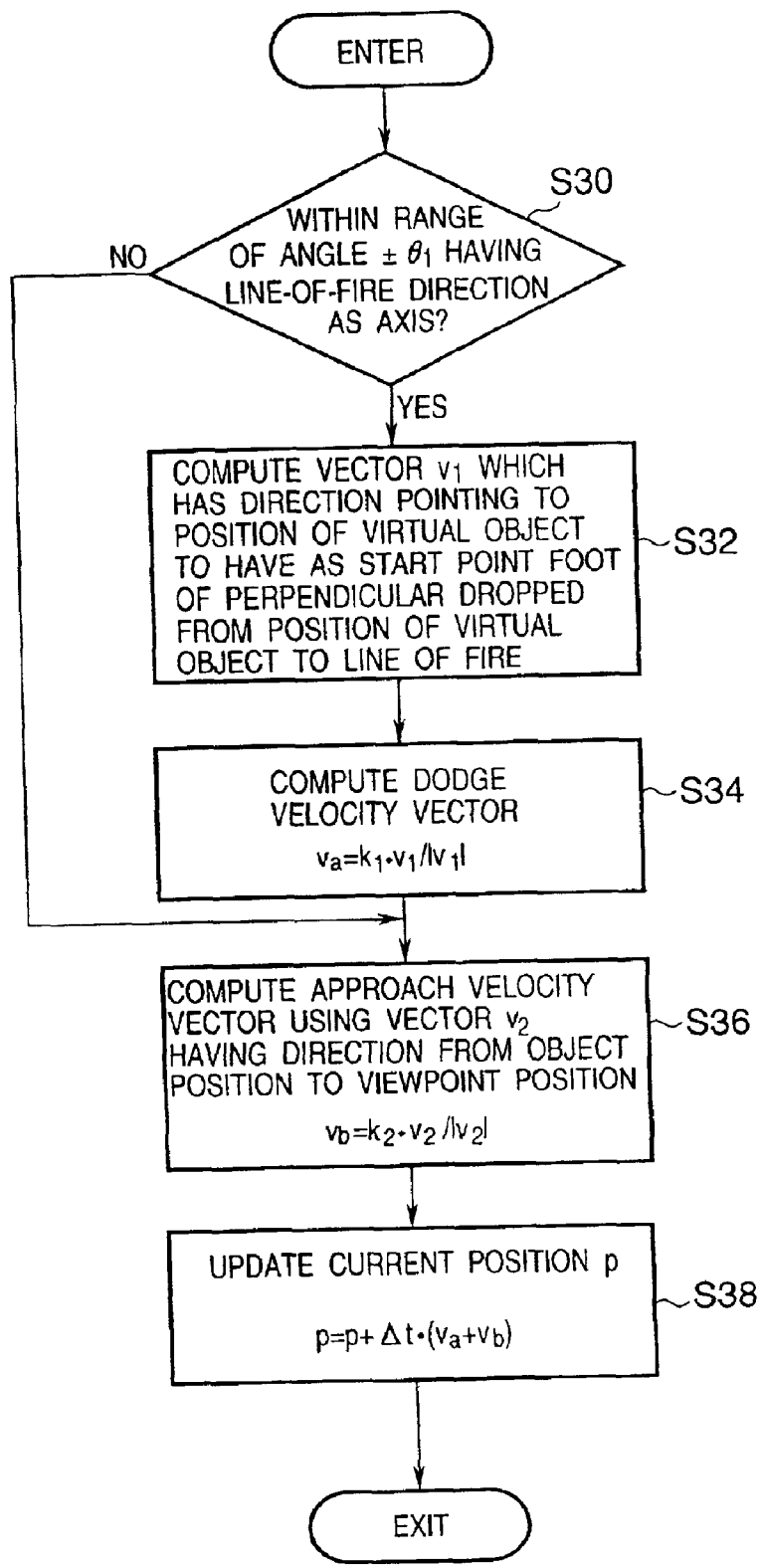
FIG. 14 is a flow chart showing the control sequence of the attack action of the virtual object.

FIG. 13 explains an example of an attack action of the target to the player. More specifically, when a player falls within a predetermined distance range from the target, the game progress processor 6002 controls the target to move toward the head of that player. At this time, for example, when the target falls within a predetermined conical range having the line-of-fire direction of the player's gun as an axis, the processor 6003 controls the target to move in a direction away from the conical range and in a direction toward the head of the player. FIG. 14 shows this control sequence.

It is checked in step S30 if a virtual object falls within the range of an angle $\pm\theta_1$ to have the line-of-fire direction as an axis. In step S32, a vector $v_1$ which has as a start point the foot of a perpendicular dropped from the position of the virtual object to the line of fire and has a direction toward the position of the virtual object is computed. In step S34, a dodge velocity vector with respect to the line of fire is computed by:

$$v_a = k_1 \cdot \frac{v_1}{|v_1|}$$

In step S36, using a vector $v_2$ from the object position to the viewpoint position a vector $v_b$ indicating an approach velocity to the player is computed by:

$$v_b = k_2 \cdot \frac{v_2}{|v_2|}$$

In step S38, the current position of the virtual object is updated based on the vectors $v_a$ and $V_b$.

Figure 15:
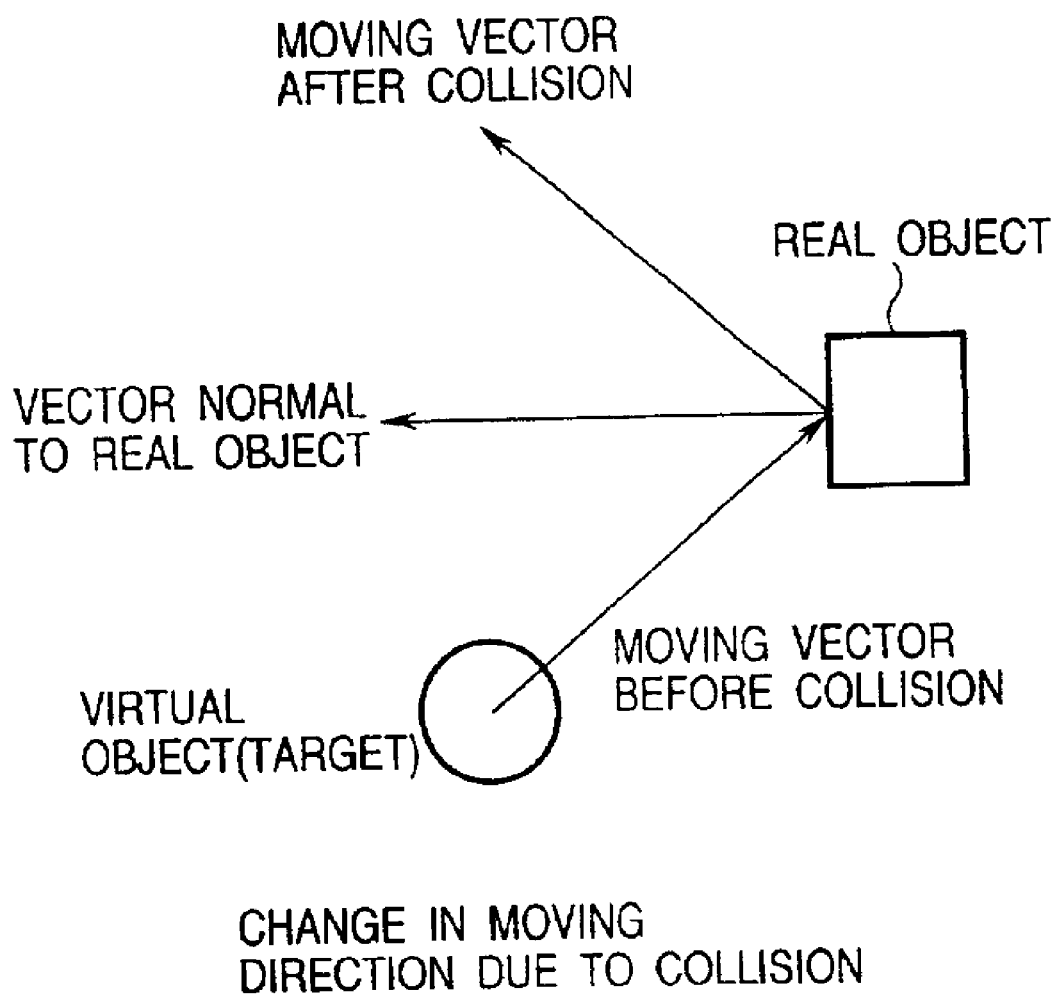
FIG. 15 is a view for explaining the pattern of a collision action of the virtual object.
Figure 16:
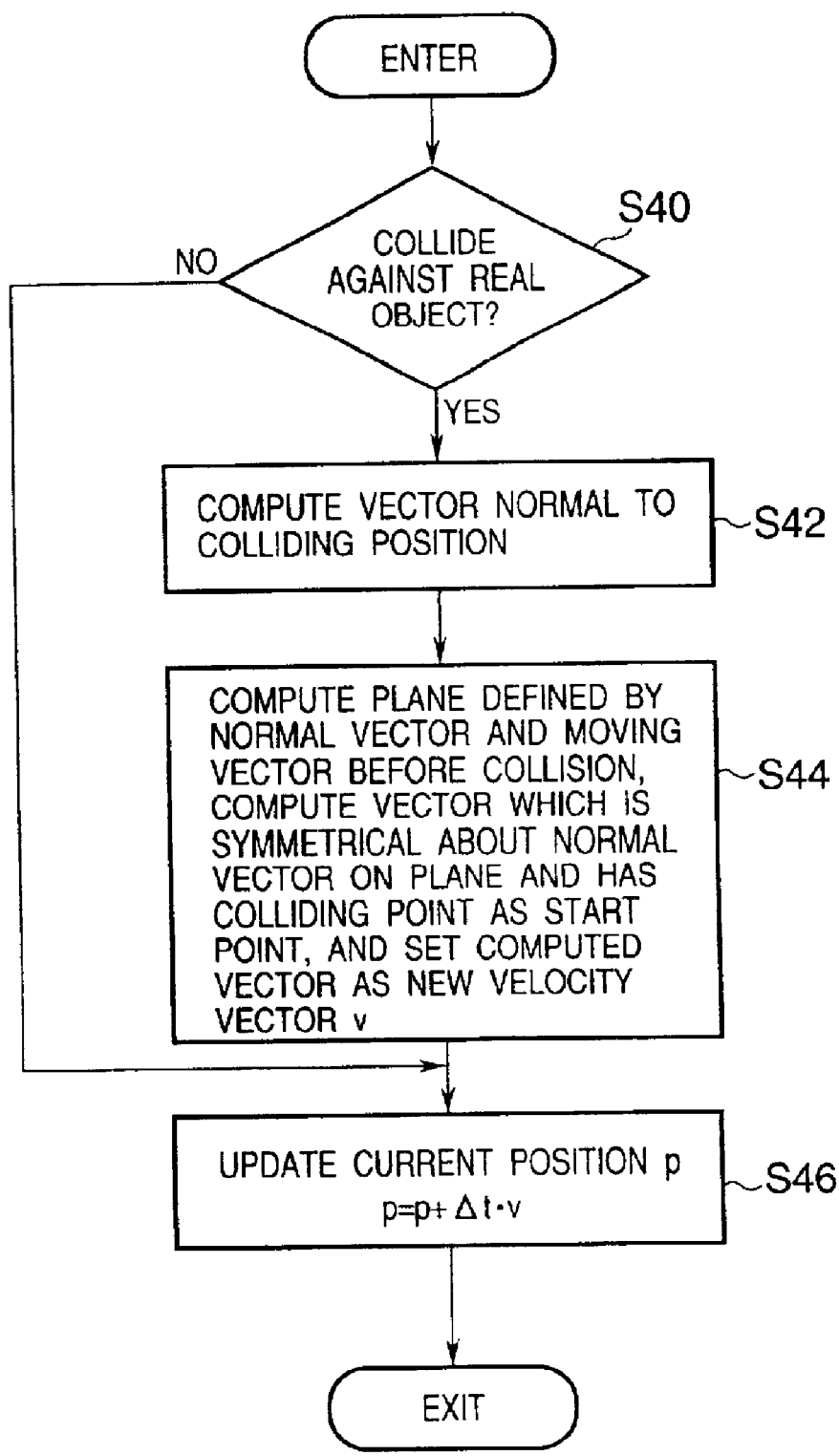
FIG. 16 is a flow chart showing the control sequence of the collision action of the virtual object.

FIG. 15 explains an action of a target when a real object is present. That is, when a real object is present in the velocity vector direction of the target, the game progress processor 6002 generates a moving vector of the target after collision, so that the target bounces off the real object. FIG. 16 shows its control sequence.

It is checked in step S40 if a virtual object has collided against a real object. In step S42, a vector normal to the colliding position is computed. In step S44, a plane defined by that normal vector and the moving vector before collision is computed, and a vector which is symmetrical about the normal vector on the plane and has a colliding point as a start point is computed. The computed vector is set as a new velocity vector v. In step S46, the current position is updated.

Figure 17:
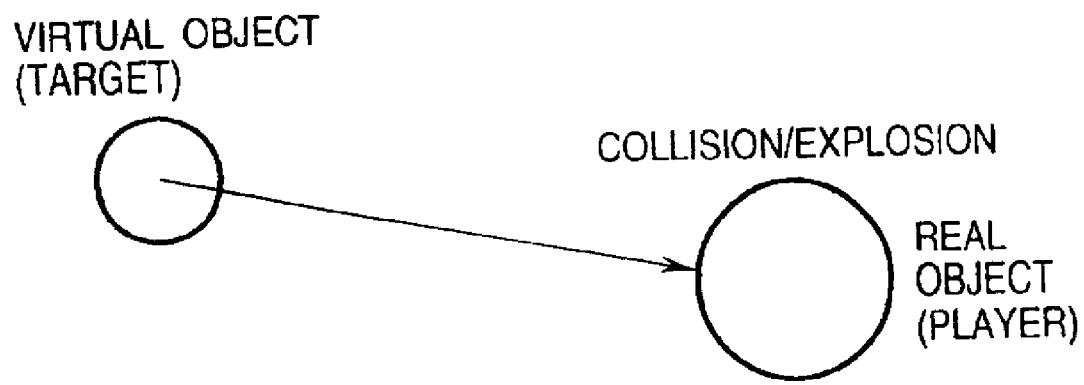
FIG. 17 is a view for explaining the pattern of a collision/explosion action of the virtual object.
Figure 18:
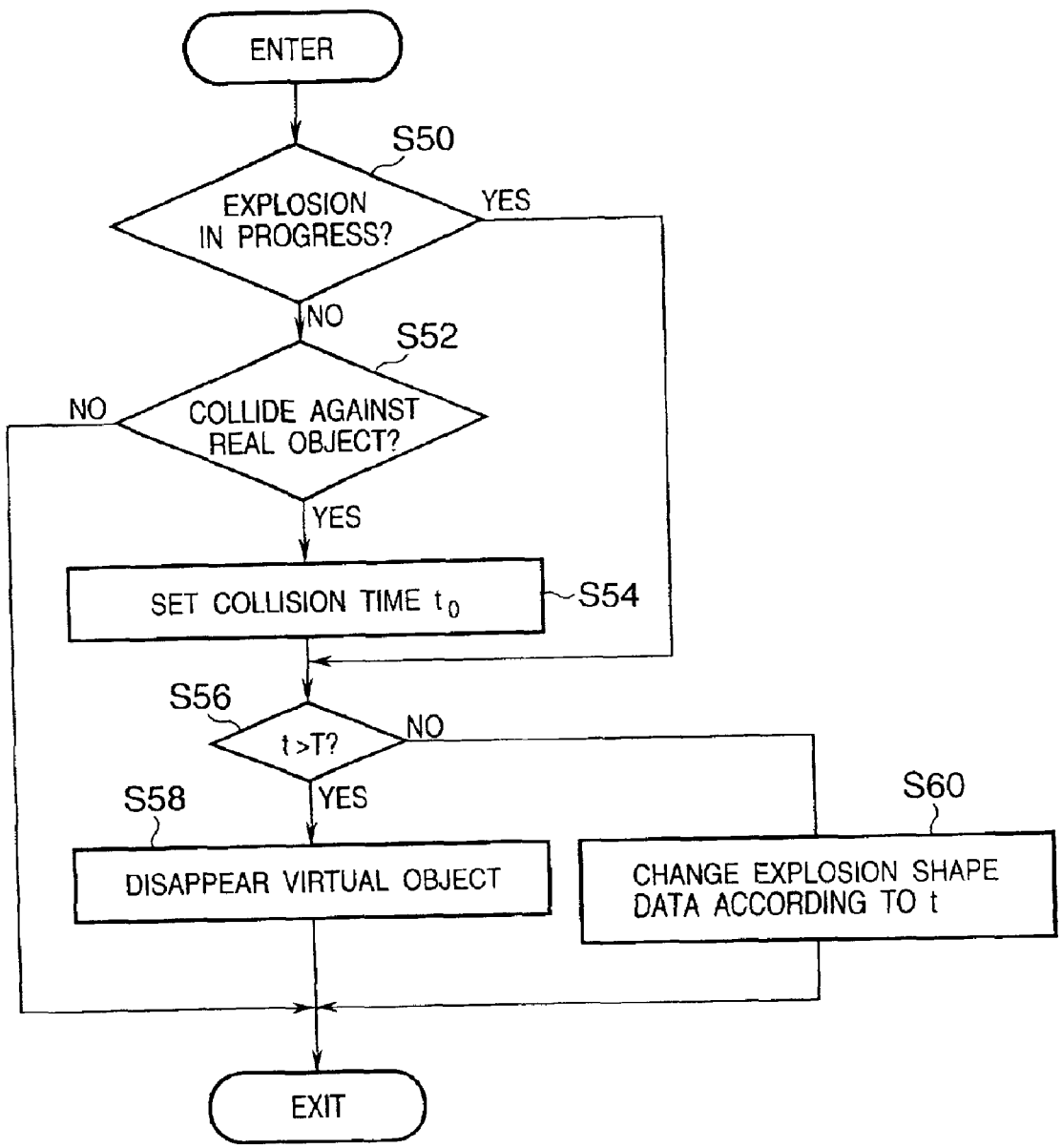
FIG. 18 a flow chart showing the control sequence of the collision/explosion action of the virtual object.

FIG. 17 explains an action in which when a real object or player is present in the velocity vector direction of a target, the game progress processor 6003 computes an interference between the target and that real object (player) and generates virtual images used when that target explodes and then disappears (e.g., images of smoke of explosion, an object which disappears gradually, and the like). FIG. 18 shows its control sequence. It is checked in step S50 if a virtual object is exploding. If NO in step S50, it is checked in step S52 if that virtual object has collided against a real object. If YES in step S52, a colliding time $t_0$ is set in step S54. It is checked in step S56 if a time t after collision has exceeded a predetermined time duration T, i.e., if a predetermined time T has elapsed after collision. If NO in step S56, an explosion pattern is displayed in correspondence with the time t elapsed in step S60. More specifically, changes in smoke of explosion are presented to the player. After the predetermined time T has elapsed, the virtual object disappears.

Figure 19:
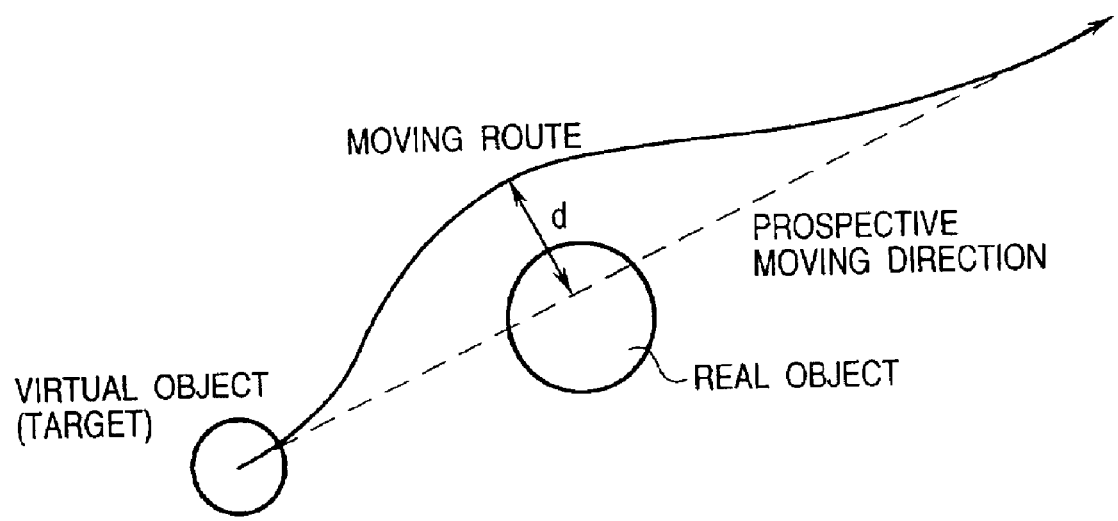
FIG. 19 is a view for explaining the pattern of a detour action of the virtual object.
Figure 20:
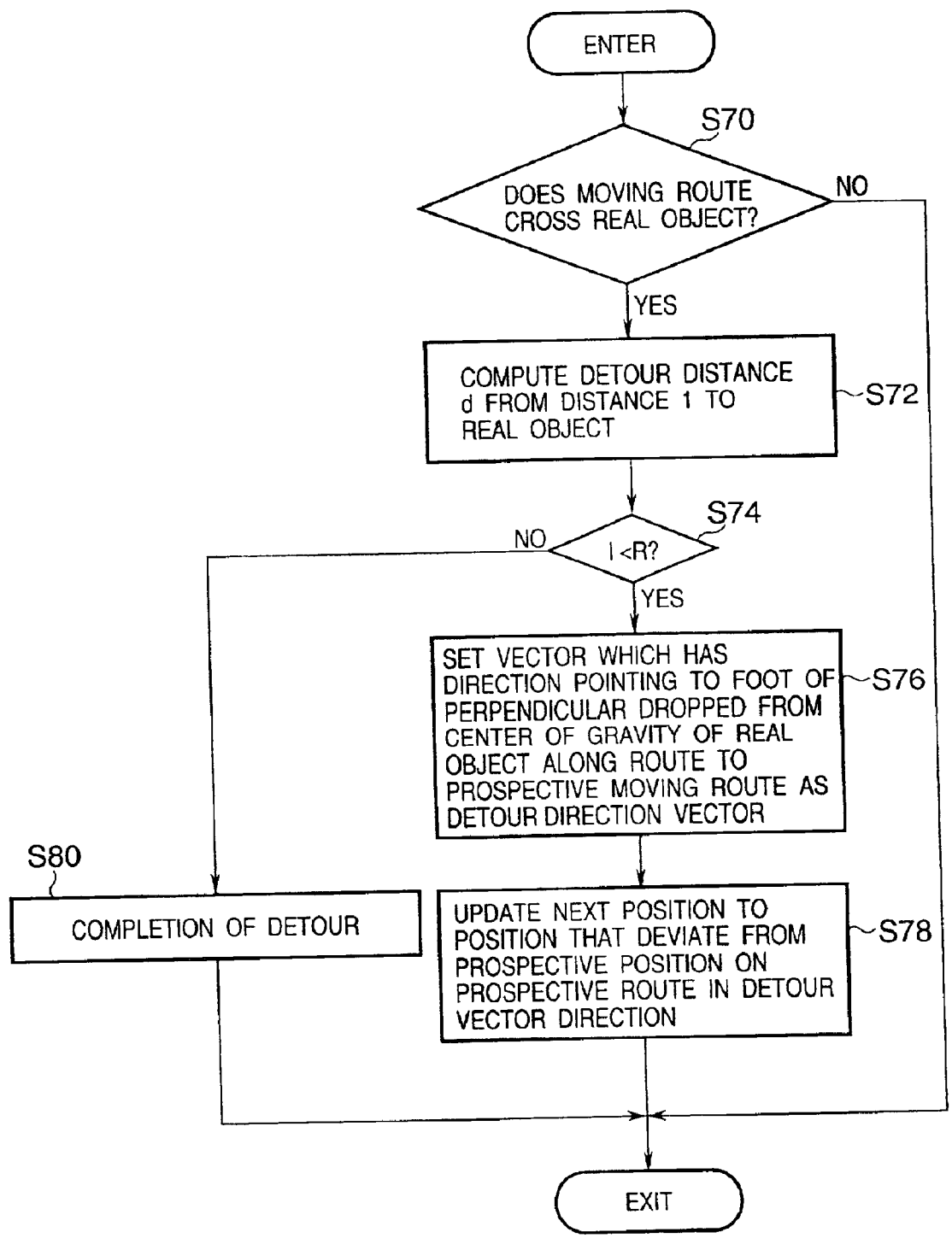
FIG. 20 is a flow chart for explaining the control sequence of the detour action of the virtual object.

FIG. 19 explains a detour action of a virtual object. That is, when a real object is present in a prospective moving direction of a target, the game progress processor 6003 generates a moving route (path) of the target which is separated minimum distance d from the prospective route and defines a smooth curve. Note that this curve may use a bezier curve, spline curve, or the like. FIG. 20 shows its control sequence.

Figure 21:
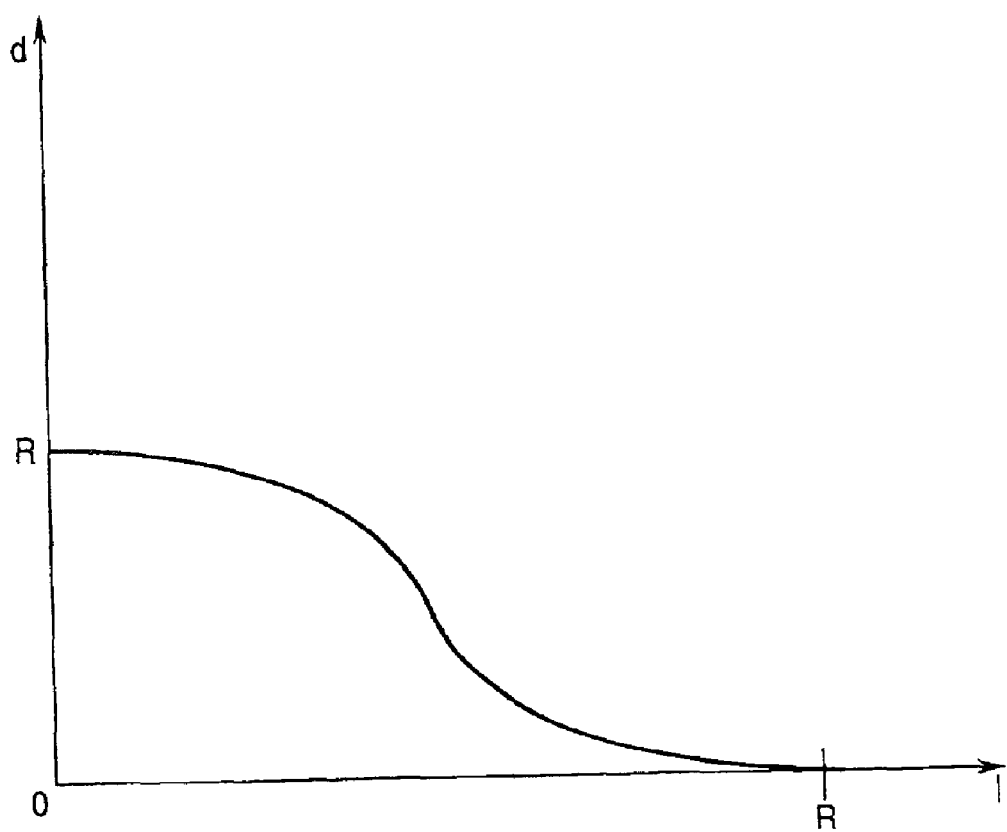
FIG. 21 is a view for explaining the pattern of a detour action of the virtual object.

It is checked in step S70 if the moving route crosses a real object (or a virtual object is detouring the real object). If YES in step S70, detour distance d is computed from distance l to the real object in accordance with FIG. 21 in step S72. This distance d is used in step S76. It is checked in step S74 if distance l from the virtual object to the real object is smaller than predetermined distance R. If $l \geq R$, completion of detour is determined (step S80). Note that R is distance which prevents the virtual object from touching the real object, and is defined by:

$$R = r_1 + r_2 + \Delta r$$

where $r_1$ is the size (e.g., radius) of the virtual object, $r_2$ is the size (e.g., radius) of the real object, and $\Delta r$ is a parameter constant for setting distance when the virtual and real objects pass each other. While l<R, a vector, which has a direction toward the foot of a perpendicular dropped from the center of gravity of the real object along the route onto the prospective moving route, and length d, is set to be a vector indicating the detour direction of the virtual object in step S76. In step S78, a vector, which has a direction toward the foot of a perpendicular dropped from the center of gravity of the real object along the route onto the prospective moving route, and length d, is set to be a detour direction vector. In this manner, the virtual object can detour the real object while maintaining distance that keeps it away from the real object.

The movement patterns of targets (virtual objects) shown in FIGS. 9 to 21 are merely examples. With this game system, the player can experience game feelings as if a virtual object (target) decided its own movement pattern in consideration of its relation with real objects including a player, and acted. Such game allows the player to feel as if the player himself or herself existed in the mixed reality space and targets as virtual images acted by sensing the presence of the player and other real objects, thus making the game more fun to play. In the prior art, especially, the hockey game proposed by the present applicant, a puck merely simulates simple natural laws such as physics, but in this embodiment, the virtual object can act with a given objective as if it had its own will.

<Modification>

Various modifications of the present invention can be made beyond the above embodiment.

For example, in the above embodiment, the video see-through HMD is used. However, the present invention can be applied to a mixed reality environment using an optical see-through HMD.

The present invention is not limited to a battle game but can also be applied to any other games as long as a virtual object preferably makes an interactive action with a player.

The movement patterns of the virtual objects are not limited to those shown in FIGS. 9 to 21.

Note that although the above-described embodiments describe a case where attacking action of a virtual object (target) to a player is determined based only upon the distance between the target and player, other arbitrary conditions may be added to motivate the virtual target to attack or activate another action.

For instance, in a case of playing a game where parameters are set for each player and the parameter(s) is changed as the game progresses, attacking action may be determined by referring to the value of the parameter(s). More specifically, for a player having a low parameter value for vigor (energy), i.e., a weakening (dying) player, intensive attack may be given. Alternatively, the virtual object (target) may stay away (run away) from a strong player (or a player is equipped with a powerful weapon). These movement (action) pattern can be stored in target information memory.

The parameters of each player can be stored in game progress processor 6002 and controlled by game management unit 5002. Game management unit 5002, e.g., decreases a life parameter of a player damaged by a target and if a player having a life parameter of which value is lower than predetermined value, controls movement of the virtual objects (target) to attack the player.

As described above, by determining the action of the virtual object (target) based on information other than the position or posture of the player, the game becomes more entertaining to the players.

To restate, according to the present invention, since the movements/actions of a virtual object are determined in consideration of its relation with real objects (that can include a player) in a mixed reality space, the game becomes more fun to play.

As many apparently widely different embodiments of the present invention can be made without departing from the spirit and scope thereof, it is to be understood that the invention is not limited to the specific embodiments thereof except as defined in the appended claims.

What is claimed is:

1. A simulator apparatus with which an operator plays a simulation in mixed reality space including a virtual space and real space in which a real object(s) is placed, said simulator comprising:

a viewpoint detection unit adapted to detect the position/orientation of a viewpoint of the operator;

an inputting unit adapted to input a real space image corresponding to the position/orientation of the viewpoint of the operator;

a geometric information acquisition unit adapted to acquire geometric information of the real object(s) placed in the real space;

a rule memory adapted to store rules for controlling the action patterns of virtual object(s);

a status memory adapted to store a simulation progress status;

a computation unit adapted to determine the next action pattern of the virtual object(s) as if a virtual object had its own will based on a command input by the operator, the simulation progress status, the rules and the geometric information of the real object(s);

a virtual space generation unit adapted to generate a virtual space image on the basis of a next position/orientation of the virtual object(s) according to the determined action pattern and the position/orientation of the viewpoint of the operator; and a mixed reality image generation unit adapted to generate a mixed reality space image by superimposing or overlaying the virtual space image on the real space image, wherein the next position/orientation of the virtual object(s) is determined based on a location relationship among the position/orientation of the viewpoint of the operator, position(s) of the virtual object(s) and the geometric information of the real object(s).

2. The apparatus according to claim 1, wherein said inputting unit captures real space images of said operator's view of the real space, and the apparatus further comprises a video see-through type display that the operator wears wherein the mixed reality images are displayed.

3. The apparatus according to claim 1, further comprising an optical see-through type display that the operator wears wherein said virtual space image is displayed.

4. The apparatus according to claim 1, further comprising:

a status detector that detects a status of the operator, wherein said computation unit also determines a next action pattern of the virtual object in accordance with the status of the operator.

5. The apparatus according to claim 1, wherein the real object(s) include other operators who operate said simulator apparatus, and the other operators share a single mixed reality space with the operator.

6. The apparatus according to claim 1, wherein the real object is an object which is fixed in position in the real space, and said geometric information acquisition unit comprises:

a predetermined memory for pre-storing position information and shape information of the real object; and a reading unit that reads out the position information and shape information of the real object from said predetermined memory as needed.

7. The apparatus according to claim 1, wherein the real object is an object which is movable but does not deform, and said geometric information acquisition unit comprises:

a predetermined memory for pre-storing shape information of the real object;

a position/orientation sensor for detecting a position/orientation of the real object; and a setting unit that sets a region the real object is expected to occupy in the mixed reality space in accordance with the detected position/orientation of the real object.

8. The apparatus according to claim 1, wherein said viewpoint detection unit detects a position/orientation of the head of the operator, and said apparatus further comprises:

a detector that detects a position/orientation of a hand of the operator; and a recognition unit adapted to recognize a relative position of the hand of the operator with respect to the head as a command on the basis of an output from said detector.

9. The apparatus according to claim 1, wherein said virtual space generation unit comprises:

an alignment unit that aligns the position/orientation of the real object to the position/orientation of the virtual object after movement;

a generation unit that generates an image of the virtual object after alignment in correspondence with an occlusion relationship; and a head-mounted display device.

10. An image processing method for a simulator apparatus with which an operator plays a game in a mixed reality space in which a real object(s) is placed, comprising:

a viewpoint detection step for detecting the position/orientation of a viewpoint of the operator;

an inputting step for inputting a real space image corresponding to the position/orientation of the viewpoint of the operator;

a geometric information acquisition step for acquiring geometric information of the real object(s) placed in the real space;

a computation step for determining the next action pattern of virtual object(s) as if a virtual object had its own will based on a command input by the operator, a simulation progress status stored in a status memory, rules stored in a rule memory for controlling the action patterns of the virtual object(s) and the geometric information of the real object(s);

a virtual space generation step for generating a virtual space image on the basis of a next position/orientation of the virtual object(s) according to the determined action pattern and the position/orientation of the viewpoint of the operator; and a mixed reality image generation step for generating a mixed reality space image by superimposing or overlaying the virtual space image on the real space image, wherein the next position/orientation of the virtual object (s) is determined based on a location relationship among the position/orientation of the viewpoint of the operator, position(s) of the virtual object(s) and the geometric information of the real object(s).

11. The method according to claim 10, wherein said inputting step captures real space images of said operator's view of the real space, and the simulator apparatus comprises a video see-through type display that the operator wears wherein the mixed reality images are displayed.

12. The method according claim to 10, wherein the operator wears an optical see-through type display and the virtual space image is displayed on the display.

13. The method according to claim 10, further comprising:

a status detecting step for detecting a status of the operator, wherein said computation step also determines a next action pattern of the virtual object in accordance with the status of the operator.

14. The method according to claim 10, wherein the real object(s) include other operators who operate the simulator apparatus, and wherein the other operators share a single mixed reality space with the operator.

15. The method according to claim 10, wherein the real object is an object which is fixed in position in the real space, and the geometric information acquisition step includes the steps of:

pre-storing position information and shape information of the real object in a predetermined memory; and reading out the position information and shape information of the real object from the predetermined memory as needed.

16. The method according to claim 10, wherein the real object is an object which is movable but does not deform, and the geometric information acquisition step includes the steps of:

pre-storing shape information of the real object in a predetermined memory;

detecting a position/orientation of the real object by a position/orientation sensor; and setting a region the real object is expected to occupy in the mixed reality space in accordance with the detected position/orientation of the real object.

17. The method according to claim 10, wherein the viewpoint detection step includes the step of detecting a position/orientation of the head of the operator, and said method further comprises:

a detection step of detecting a position/orientation of a hand of the operator; and a step of recognizing a relative position of the hand of the operator with respect to the head as a command on the basis of an output in the detection step.

18. The method according to claim 10, wherein the virtual space generation step includes the steps of:

aligning the position/orientation of the real object to the position/orientation of the virtual object after movement; and generating an image of the virtual object after alignment in correspondence with an occlusion relationship.

19. A storage medium which stores a program of an image processing method for a simulator apparatus with which an operator plays a simulation in a mixed reality space including a virtual space and real space in which a real object(s) is placed, comprising:

a viewpoint detection program step for detecting the position/orientation of a viewpoint of the operator;

an inputting program step for inputting a real space image corresponding to the position/orientation of the viewpoint of the operator;

a geometric information acquisition program step for acquiring geometric information of the real object(s) placed in the real space;

a computation program step for determining the next action pattern of virtual object(s) as if a virtual object had its own will based on a command input by the operator, a simulation progress status stored in a status memory, rules stored in a rule memory for controlling the action patterns of the virtual object(s), and the geometric information of the real object(s);

a virtual space generation program step for generating a virtual space image on the basis of a next position/orientation of the virtual object(s) according to the action pattern and the position/orientation of the viewpoint of the operator; and a mixed reality image generation program step for generating a mixed reality space image by superimposing or overlaying the virtual space image on the real space image, wherein the next position/orientation of the virtual object(s) is determined based on a location relationship among the position/orientation of the viewpoint of the operator, position(s) of the virtual object(s) and the geometric information of the real object(s).

* * * * *

UNITED STATES PATENT AND TRADEMARK OFFICE
CERTIFICATE OF CORRECTION

PATENT NO. : 6,951,515 B2  
APPLICATION NO. : 09/506084  
DATED : October 4, 2005  
INVENTOR(S) : Toshikazu Ohshima et al.

Page 1 of 1

It is certified that error appears in the above-identified patent and that said Letters Patent is hereby corrected as shown below:

Column 1,  
Line 38, "an" should read -- a --.

Column 2,  
Line 1, "thee" should read -- the --.

Signed and Sealed this

Twentieth Day of June, 2006

JON W. DUDAS  
*Director of the United States Patent and Trademark Office*